(12) United States Patent
Whitney et al.

(10) Patent No.: US 8,397,694 B2
(45) Date of Patent: Mar. 19, 2013

(54) AIRFLOW-BASED CRANK THROTTLE CONTROL IN A TORQUE-BASED SYSTEM

(75) Inventors: Christopher E. Whitney, Highland, MI (US); Jon C. Miller, Fenton, MI (US); Robert C. Simon, Jr., Brighton, MI (US); Michael Livshiz, Ann Arbor, MI (US); Jeffrey M. Kaiser, Highland, MI (US); Todd R. Shupe, Milford, MI (US); Mark D. Carr, Fenton, MI (US)

(73) Assignee: GM Global Technology Operations LLC

( * ) Notice: Subject to any disclaimer, the term of this patent is extended or adjusted under 35 U.S.C. 154(b) by 1149 days.

(21) Appl. No.: 11/848,687

(22) Filed: Aug. 31, 2007

(65) Prior Publication Data
US 2009/0056672 A1 Mar. 5, 2009

(51) Int. Cl.
*F02B 57/04* (2006.01)
(52) U.S. Cl. ........................... 123/395; 123/319
(58) Field of Classification Search .............. 123/482, 123/478, 488, 497, 505, 406.46, 406.53, 123/452, 458; 137/101.19, 9, 551; 700/63–69, 700/187, 56; 701/104, 101, 102, 103, 105
See application file for complete search history.

(56) References Cited

U.S. PATENT DOCUMENTS

| | | | | |
|---|---|---|---|---|
| 4,048,964 A | * | 9/1977 | Kissel | 123/482 |
| 4,408,582 A | * | 10/1983 | Merrick | 123/406.46 |
| 6,366,847 B1 | * | 4/2002 | Sun et al. | 701/103 |
| 7,024,301 B1 | * | 4/2006 | Kar et al. | 701/104 |
| 2003/0204302 A1 | * | 10/2003 | Amano | 701/102 |

FOREIGN PATENT DOCUMENTS

| | | |
|---|---|---|
| DE | 19618385 | 11/1997 |
| DE | 10140810 | 5/2002 |
| DE | 102006003131 | 8/2007 |

OTHER PUBLICATIONS

U.S. Appl. No. 60/919,995, filed Mar. 26, 2007, Christopher Whitney et al.
U.S. Appl. No. 11/712,597, filed Feb. 28, 2007, Leonard G. Wozniak et al.
U.S. Appl. No. 60/861,494, filed Nov. 28, 2006, Michael Livshiz et al.
U.S. Appl. No. 11/656,929, filed Jan. 27, 2007, Michael Livshiz et al.
U.S. Appl. No. 11/208,435, filed Aug. 19, 2005, Michael Livshiz et al.
U.S. Appl. No. 11/685,714, filed Mar. 13, 2007, David Stroh et al.

* cited by examiner

*Primary Examiner* — Lindsay Low

(57) ABSTRACT

A method of torque-based control for an internal combustion engine may include determining a desired airflow rate into an intake manifold of the internal combustion engine during an engine start condition, determining a torque limit for a torque-based engine control module based on the desired airflow rate, and regulating engine torque based on the determined torque limit.

20 Claims, 3 Drawing Sheets

AIRFLOW-BASED CRANK THROTTLE CONTROL IN A TORQUE-BASED SYSTEM

FIELD

The present disclosure relates to engine control systems, and more particularly to torque-based engine control systems.

BACKGROUND

The statements in this section merely provide background information related to the present disclosure and may not constitute prior art.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. As can be appreciated, increasing the air and fuel to the cylinders increases the torque output of the engine.

Torque-based engine control systems may regulate engine torque output levels during engine operation. Engine starting may be controlled based on a desired torque level. A desired throttle area for engine starting may be calibrated in terms of the desired torque level. Alternately, a throttle area may be directly calibrated for engine starting conditions. Control of throttle position ultimately controls airflow into the engine.

SUMMARY

Accordingly, a method of torque-based control for an internal combustion engine may include determining a desired airflow rate into an intake manifold of the internal combustion engine during an engine start condition, determining a torque limit for a torque-based engine control module based on the desired airflow rate, and regulating engine torque based on the determined torque limit.

The method may further include calculating the torque limit. The torque limit may be used as a minimum torque value for regulation of the engine torque.

An engine control module may include an engine start module, an airflow-to-torque determination module, and a system torque control module. The engine start module may determine a first desired airflow rate into an intake manifold of an internal combustion engine during an engine start condition. The airflow-to-torque determination module may be in communication with the engine start module to determine a torque limit based on the first desired airflow rate. The system torque control module may be in communication with the airflow-to-torque determination module to regulate engine torque based on the determined torque limit.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
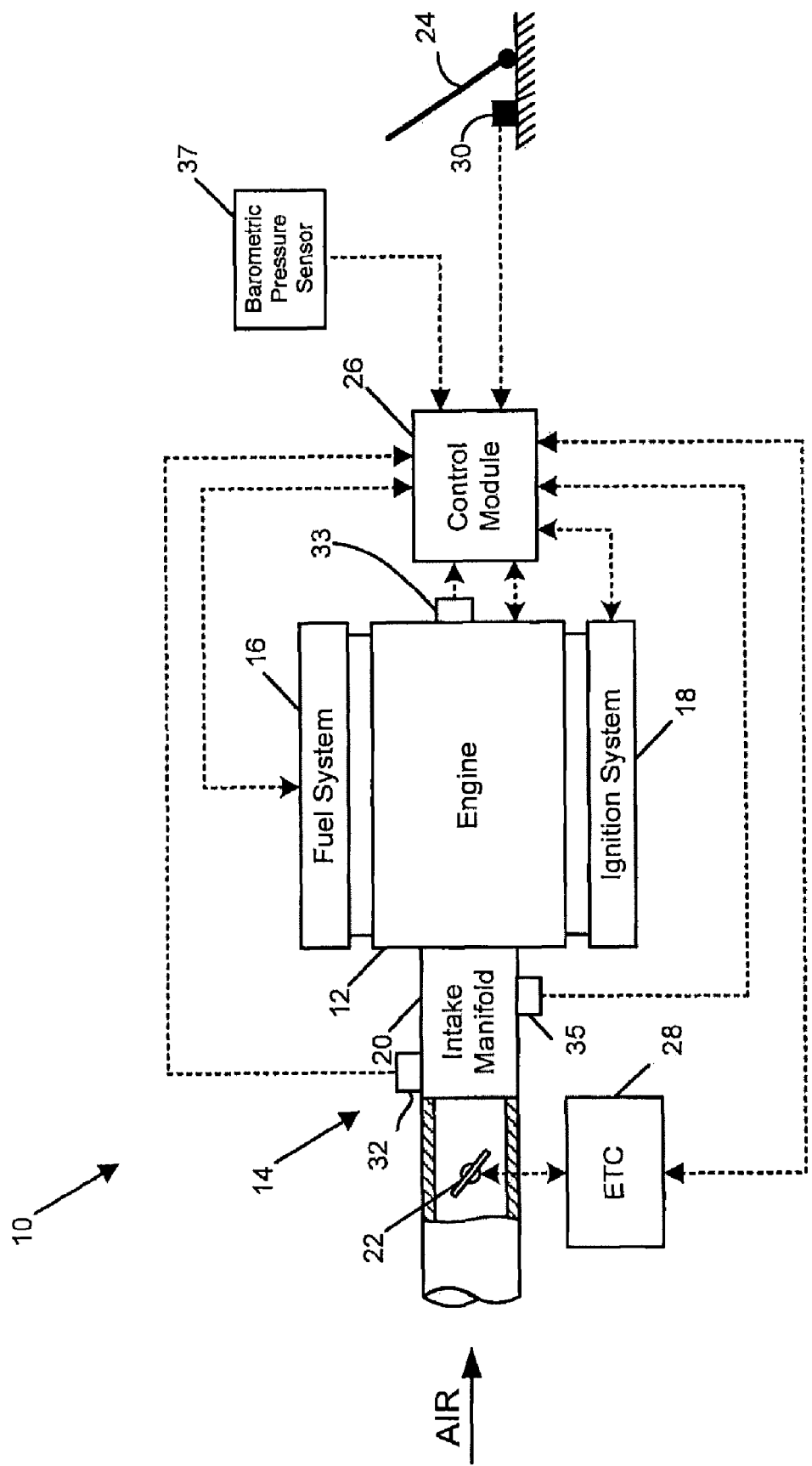
FIG. 1 is a schematic illustration of a vehicle according to the present disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary vehicle 10 is schematically illustrated. Vehicle 10 may include an engine 12 in communication with an intake system 14, a fuel system 16, and an ignition system 18. Intake system 14 may include an intake manifold 20 and a throttle 22. Throttle 22 may control an airflow into engine 12. Fuel system 16 may control a fuel flow into engine 12 and ignition system 18 may ignite the air/fuel mixture provided to engine 12 by intake system 14 and fuel system 16.

Vehicle 10 may further include an accelerator pedal 24, a control module 26, and an electronic throttle control (ETC) 28. Accelerator pedal 24 may be in communication with an accelerator pedal sensor 30. Accelerator pedal sensor 30 may be in communication with control module 26 and may provide a signal indicative of accelerator pedal position.

Control module 26 may be in communication with ETC 28 and may provide a signal indicative of the position of accelerator pedal 24 to ETC 28. ETC 28 may be in communication with throttle 22 and may control operation thereof based on the accelerator pedal position. An intake air temperature (IAT) sensor 32, an engine coolant temperature sensor 33, a manifold absolute pressure sensor 35 and a barometric pressure sensor 37, may be in communication with control module 26 and may provide signals thereto indicative of an intake air temperature, a coolant temperature, a manifold absolute pressure (MAP), and a barometric pressure ($P_{BARO}$), respectively.

Figure 2:
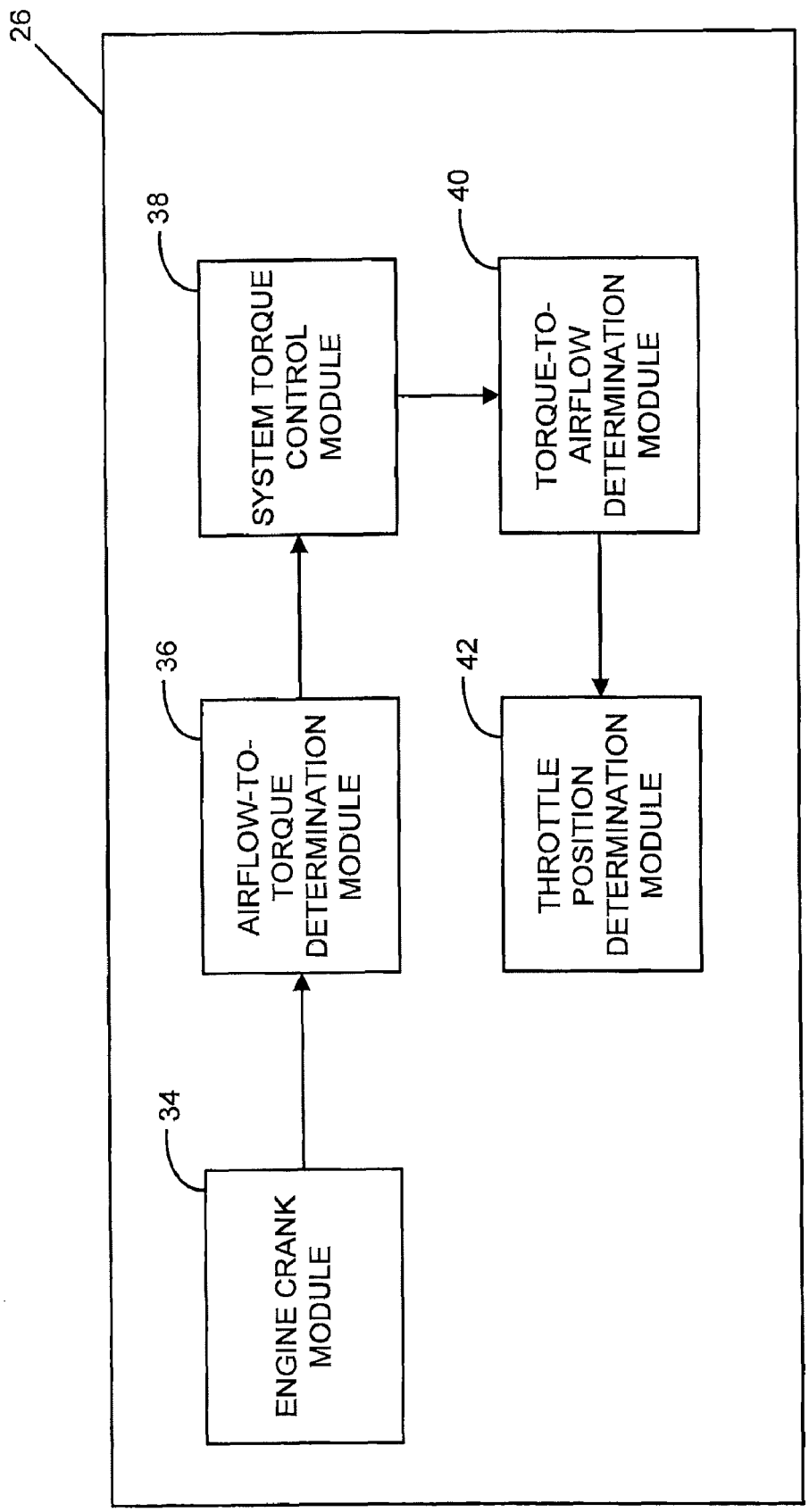
FIG. 2 is a control block diagram of the control module shown in FIG. 1.

Control module 26 may provide a torque-based control of engine 12. With reference to FIG. 2, control module 26 may include an engine start module 34, an airflow-to-torque determination module 36, a system torque control module 38, a torque-to-airflow determination module 40 (which may generally include the inverse solution of airflow-to-torque determination module 36), and a throttle position determination module 42. Engine start module 34 may be in communication with airflow-to-torque determination module 36 and may provide a signal thereto indicative of an initial desired airflow value ($MAF_{DES\_i}$) for an engine start condition. Engine start module 34 may determine $MAF_{DES\_i}$ based on a series of parameters including engine coolant temperature, engine run time, and barometric pressure, as discussed below. Engine start module 34 may determine $MAF_{DES\_i}$ at predetermined time steps throughout engine cranking at startup. When engine 12 transitions from cranking to idle, engine start module 34 may provide a signal to airflow-to-torque determination module 36 indicative of a current $MAF_{DES\_i}$.

Airflow-to-torque determination module 36 may be in communication with system torque control module 38 and may provide a signal thereto indicative of a minimum torque level ($T_{MIN}$) for engine 12 based on $MAF_{DES\_i}$ from engine start module 34. Airflow-to-torque determination module 36 may determine the $T_{MIN}$ value corresponding to $MAF_{DES\_i}$ through a calculation. $MAF_{DES\_i}$ may be converted to an air-per-cylinder (APC) value and passed to the calculation. The calculation may include a torque model, such as an APC torque model as disclosed in U.S. Provisional Patent Application Ser. No. 60/861,494, the disclosure of which is expressly incorporated herein by reference.

$T_{MIN}$ provided to system torque control module 38 may be used as a minimum torque level for operation of engine 12 during vehicle operation. More specifically, $T_{MIN}$ may be used for torque regulation of engine 12. System torque control module 38 may set a minimum torque level for engine idle control. System torque control module 38 may further include a torque arbitration system, such as the system disclosed in U.S. patent application Ser. No. 11/712,597, the disclosure of which is expressly incorporated herein by reference. System torque control module 38 may generally control vehicle torque requests based on the minimum torque level needed to prevent undesirable conditions such as engine stall.

An adjusted torque level ($T_{ADJ}$) from system torque control module 38 may then be passed to torque-to-airflow determination module 40. $T_{ADJ}$ provided by system torque control module 38 may be generally similar to $T_{MIN}$ provided by airflow-to-torque determination module 36. However, system torque control module 38 may additionally account for driver torque requests. For example, the position of accelerator pedal 24 may be provided to system torque control module 38 by accelerator pedal sensor 30.

During the determination of $MAF_{DES\_i}$ from engine start module 34, accelerator pedal position may be initialized to a zero position corresponding to a non-actuated accelerator pedal 24. Initialization of accelerator pedal position may generally provide for elimination of a "dead pedal" condition. A "dead pedal" condition may generally be characterized as a displacement of accelerator pedal 24 without a corresponding increase in throttle opening. As such, the zero pedal position may correspond to a position of throttle 22 corresponding to $T_{ADJ}$ with accelerator pedal 24 in a non-actuated position. Therefore, if a user steps into accelerator pedal 24, a torque request is generated at system torque control module 38. This request is passed on to torque-to-airflow determination module 40 where a final desired engine airflow ($MAF_{DES\_f}$) is determined.

$MAF_{DES\_f}$ may be determined in a manner similar to that described above regarding the $T_{MIN}$ determination at airflow-to-torque determination module 36. The calculation may include a torque model, such as an inverse APC torque model as disclosed in U.S. Provisional Patent Application Ser. No. 60/861,494. As indicated above, the $MAF_{DES\_f}$ determined by torque-to-airflow determination module 40 may generally be equal to $MAF_{DES\_i}$ from engine start module 34 adjusted by any further torque requests from system torque control module 38. $MAF_{DES\_f}$ may then be used to adjust a throttle area for engine starting.

More specifically, torque-to-airflow determination module 40 may provide a signal to throttle position determination module 42 indicative of $MAF_{DES\_f}$. Throttle position determination module 42 may determine the desired throttle area ($A_{THRDES}$) associated with $MAF_{DES\_f}$. $A_{THRDES}$ may be determined based on a flow density associated with atmospheric conditions and $MAF_{DES\_f}$. As such, varying atmospheric conditions are automatically accounted for. $A_{THRDES}$ may be determined as follows:

$$A_{THRDES} = \frac{MAF_{DES\_f} * \sqrt{R * IAT}}{P_{BARO} * \Phi\left(\frac{MAP}{P_{BARO}}\right)}$$

where R is the universal gas constant and $\phi$ is based on $P_R$ in accordance with the following relationships:

$$\Phi = \begin{cases} \sqrt{\frac{2\gamma}{\gamma-1}\left(1 - P_R^{\frac{\gamma-1}{\gamma}}\right)} & \text{if } P_R > P_{critical} = \left(\frac{2}{\gamma+1}\right)^{\frac{\gamma}{\gamma-1}} = 0.528 \\ \sqrt{\gamma\left(\frac{2}{\gamma+1}\right)^{\frac{\gamma+1}{(\gamma-1)}}} & \text{if } P_R \leq P_{critical} \end{cases}$$

$P_R$ is generally determined as the ratio between MAP and $P_{BARO}$. $P_{BARO}$ can be directly measured with barometric pressure sensor 37 or may be calculated using other known parameters. $P_{CRITICAL}$ is defined as the pressure ratio at which the velocity of the air flowing past the throttle equals the velocity of sound. This condition is called choked or critical flow. The critical pressure ratio is determined by:

$$P_{CRITICAL} = \left(\frac{2}{\gamma+1}\right)^{\gamma/\gamma-1}$$

where $\gamma$ is equal to the ratio of specific heat for air and range from about 1.3 to about 1.4. As such, the present disclosure provides for accurate torque control under varying environmental conditions by consideration the pressure ratio $P_R$.

Figure 3:
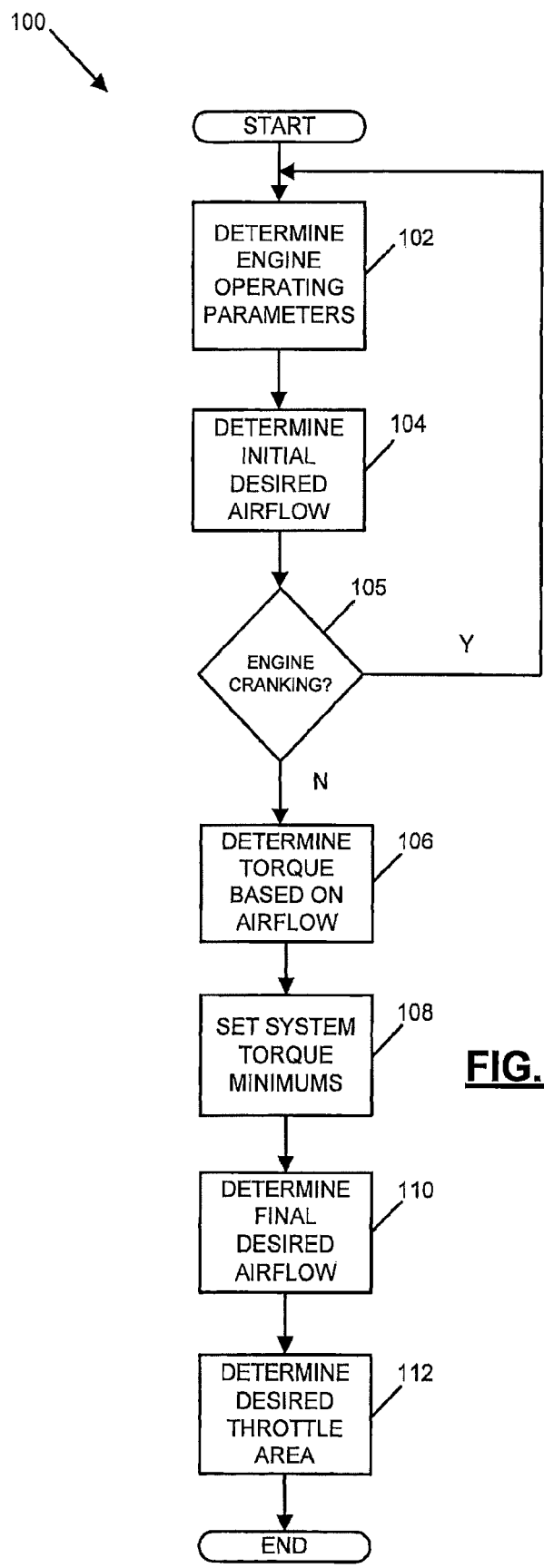
FIG. 3 is a flow diagram illustrating steps for determining torque-based engine control according to the present disclosure.

FIG. 3 depicts the airflow-based crank throttle control system control logic generally at 100. Control logic 100 may generally determine an airflow rate needed to provide a stable start-up and idle condition for engine 12. Control logic 100 may use the determined airflow value to set minimum torque levels for engine operation, as well as a throttle area for engine start. Control logic 100 may begin at determination block 102 where engine operating parameters are determined. Engine operating parameters may include engine coolant temperature, engine run time, and barometric pressure. Control logic 100 may then proceed to determination block 104 where $MAF_{DES\_i}$ is determined.

$MAF_{DES\_i}$ may be determined based on a predetermined lookup table as a function of the determined engine operating parameters. $MAF_{DES\_i}$ may generally be associated with an airflow that is desirable for an engine cranking/start condition. Once $MAF_{DES\_i}$ is determined, control logic 100 proceeds to determination block 106, where a torque value is determined. The torque value may be determined based on $MAF_{DES\_i}$. The torque value may be determined as indicated above regarding airflow-to-torque determination module 36. Control logic 100 may then proceed to control block 108 where system torque minimums ($T_{MIN}$) may be set. $T_{MIN}$ may be set as indicated above regarding system torque control module 38.

Control block 108 may additionally account for additional torque requests from a user, such as accelerator pedal actuation. Control block 108 may modify the torque value provided by determination block 106 based on these additional user torque requests to an adjusted torque ($T_{ADJ}$). The $T_{ADJ}$ request may be provided to determination block 110 where a final desired airflow ($MAF_{DES\_f}$) is determined.

Determination block 110 may determine $MAF_{DES\_f}$ based on the $T_{ADJ}$ provided by control block 108 using an inverse torque calculation, as indicated above regarding torque-to-airflow determination module 40. Control logic 100 may then proceed to determination block 112 where a desired throttle area ($A_{THRDES}$) is determined.

$MAF_{DES\_f}$ may be used to determine $A_{THRDES}$, as indicated above regarding throttle position determination module 42. As indicated above, $A_{THRDES}$ may account for intake air temperature, barometric pressure relative to MAP, as well as $MAF_{DES\_f}$.

Control logic 100 may then proceed to decision block 114 where engine operation is evaluated. If engine 12 is still in a starting mode, control logic 100 returns to determination block 102 and continues as indicated above. Engine 12 may transition to an idle condition after completion of the starting mode. If engine 12 is no longer in the starting mode (i.e., engine 12 has transitioned to the idle condition), control logic 100 may terminate. The last values generated for system torque minimums, desired airflow, and desired throttle area by determination blocks 106, 110, and 112, respectively may be used for transition from engine starting mode to engine idle.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings and the specification.

What is claimed is:

1. A method, comprising:
   determining a desired airflow rate into an intake manifold of an internal combustion engine during an engine start condition;
   determining a torque limit for a torque-based engine control module based on the desired airflow rate; and
   regulating engine torque based on the determined torque limit.

2. The method of claim 1 wherein said regulating includes providing said torque limit to the torque-based engine control module for use as a minimum torque limit for engine operation.

3. The method of claim 1 further comprising determining a barometric pressure, the first desired airflow rate being determined based on the barometric pressure.

4. The method of claim 3 further comprising determining an airflow density based on the barometric pressure.

5. The method of claim 1 wherein said determining a desired airflow rate includes determining first and second desired airflow rates, wherein said first desired airflow rate is used for said determining a torque limit and said second desired airflow rate is determined based on the determined torque limit.

6. The method of claim 5 further comprising determining a user torque request and adjusting the torque limit based on the user torque request, the second desired airflow rate being determined based on the adjusted torque limit.

7. The method of claim 5 further comprising determining a desired throttle area based on the second determined airflow rate.

8. The method of claim 7 wherein said determining a desired throttle position includes determining an airflow density based on a ratio between a manifold absolute pressure and a barometric pressure.

9. The method of claim 1 wherein said determining a torque limit includes calculating a torque value based on the desired airflow rate.

10. A method, comprising:
    determining a desired airflow rate into an intake manifold of an internal combustion engine during an engine start condition;
    calculating a torque limit for a torque-based engine control module based on the desired airflow rate; and
    regulating engine torque using the determined torque limit as a minimum torque value.

11. The method of claim 10 wherein said determining a desired airflow rate includes determining first and second desired airflow rates, wherein said first desired airflow rate is used for said calculating a torque limit and said second desired airflow rate is determined based on the calculated torque limit.

12. The method of claim 11 further comprising determining a desired throttle position based on the second determined airflow rate.

13. The method of claim 12 wherein said determining a desired throttle position includes determining an airflow density based on a ratio between a manifold absolute pressure and a barometric pressure.

14. A control module, comprising:
    an engine start module to determine a first desired airflow rate into an intake manifold of an internal combustion engine during an engine start condition;
    an airflow-to-torque determination module in communication with said engine start module to determine a torque limit based on the first desired airflow rate; and
    a system torque control module in communication with said airflow-to-torque determination module to regulate engine torque based on the determined torque limit.

15. The control module of claim 14 wherein said system torque control module uses the determined torque limit as a minimum torque value for regulation of engine torque.

16. The control module of claim 14 wherein said system torque control module generates an adjusted torque limit based on a user torque request.

17. The control module of claim 16 further comprising a torque-to-airflow determination module in communication with said system torque control module to determine a second desired airflow rate based on the adjusted torque limit.

18. The control module of claim 17 further comprising a throttle position determination module in communication with said torque-to-airflow determination module to determine a desired throttle position based on the second desired airflow rate.

19. The control module of claim 18 wherein the throttle position determination module determines the desired throttle position based on a ratio between manifold absolute pressure and barometric pressure.

20. The control module of claim 14 wherein said airflow-to-torque determination module calculates the torque limit based on the first desired airflow rate.

* * * * *